United States Patent
Tsuyuzaki et al.

(10) Patent No.: US 10,913,340 B2
(45) Date of Patent: Feb. 9, 2021

(54) VEHICLE BODY LOWER STRUCTURE

(71) Applicant: HONDA MOTOR CO., LTD., Tokyo (JP)

(72) Inventors: Takumi Tsuyuzaki, Wako (JP); Hiroyuki Ozawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 19 days.

(21) Appl. No.: 16/413,697

(22) Filed: May 16, 2019

(65) Prior Publication Data

US 2019/0359048 A1 Nov. 28, 2019

(30) Foreign Application Priority Data

May 25, 2018 (JP) .................. 2018-100965

(51) Int. Cl.
*B60K 1/04* (2019.01)
*B62D 25/02* (2006.01)
*B62D 25/20* (2006.01)
*B62D 21/15* (2006.01)

(52) U.S. Cl.
CPC .............. *B60K 1/04* (2013.01); *B62D 21/157* (2013.01); *B62D 25/025* (2013.01); *B60K 2001/0438* (2013.01); *B62D 25/2036* (2013.01)

(58) Field of Classification Search
CPC .... B62D 21/15; B62D 21/155; B62D 21/157; B62D 25/025; B62D 25/20; B62D 25/2036; B60K 1/04; B60K 2001/0438
See application file for complete search history.

(56) References Cited

U.S. PATENT DOCUMENTS

| 9,259,998 B1* | 2/2016 | Leanza | B62D 25/20 |
| 10,207,574 B2* | 2/2019 | Ozawa | H01M 2/1083 |
| 10,293,861 B2* | 5/2019 | Jeong | B62D 25/025 |
| 2006/0272877 A1* | 12/2006 | Nozaki | B60K 15/063 180/291 |

(Continued)

FOREIGN PATENT DOCUMENTS

| JP | 07-246842 | 9/1995 |
| JP | 2017-196952 | 11/2017 |

(Continued)

OTHER PUBLICATIONS

Computer translation of WO 2017/207502 (Year: 2017).*
Japanese Office Action for Japanese Patent Application No. 2018-100965 dated Oct. 29, 2019.

*Primary Examiner* — Gregory A Blakenship
(74) *Attorney, Agent, or Firm* — Amin, Turocy & Watson, LLP (57) ABSTRACT

A vehicle body lower structure includes a battery pack, side sills, and a battery side frame that extends in a forward/rearward direction between the side sills and the battery pack and that is configured to support the battery pack, the battery side frame has a first attachment member fixed to the side sills, and a second attachment member that is coupled to the battery pack and that constitutes a closed cross section between the first attachment member and the battery pack, and the first attachment member has an outer fixing point fixed to the side sills and an inner fixing point fixed to a wall that constitutes a closed cross section of the second attachment member.

5 Claims, 6 Drawing Sheets

(56) References Cited

U.S. PATENT DOCUMENTS

| | | | | |
|---|---|---|---|---|
| 2011/0206890 A1* | 8/2011 | Belpaire | B62D 29/001 | |
| | | | 428/68 | |
| 2012/0212009 A1* | 8/2012 | Ishizono | B62D 25/025 | |
| | | | 296/193.07 | |
| 2013/0026786 A1* | 1/2013 | Saeki | B60K 1/04 | |
| | | | 296/187.12 | |
| 2013/0049408 A1* | 2/2013 | Kurogi | B62D 25/025 | |
| | | | 296/209 | |
| 2013/0229030 A1* | 9/2013 | Yamaguchi | B62D 21/157 | |
| | | | 296/193.07 | |
| 2014/0021744 A1* | 1/2014 | Imamura | B62D 21/09 | |
| | | | 296/187.08 | |
| 2014/0117716 A1* | 5/2014 | Patberg | B62D 1/04 | |
| | | | 296/187.08 | |
| 2014/0338996 A1* | 11/2014 | Baccouche | B62D 21/152 | |
| | | | 180/68.5 | |
| 2014/0338997 A1* | 11/2014 | Okada | B62D 25/00 | |
| | | | 180/68.5 | |
| 2016/0257346 A1* | 9/2016 | Wu | B60K 1/04 | |
| 2016/0375750 A1* | 12/2016 | Hokazono | B62D 25/2036 | |
| | | | 180/68.5 | |
| 2017/0267089 A1* | 9/2017 | Sugizaki | B60K 1/04 | |
| 2018/0050607 A1* | 2/2018 | Matecki | H01M 2/1083 | |
| 2018/0194212 A1* | 7/2018 | Hamilton | B62D 21/02 | |
| 2018/0237075 A1* | 8/2018 | Kawabe | B60L 50/66 | |
| 2018/0370577 A1* | 12/2018 | Takahashi | B62D 25/2018 | |
| 2019/0031241 A1* | 1/2019 | Ayukawa | B60L 50/66 | |
| 2019/0248423 A1* | 8/2019 | Kato | B62D 25/025 | |
| 2019/0326573 A1* | 10/2019 | Ozawa | B60K 1/04 | |
| 2019/0359047 A1* | 11/2019 | Tsuyuzaki | B62D 25/2036 | |
| 2019/0359048 A1* | 11/2019 | Tsuyuzaki | B60K 1/04 | |
| 2019/0359265 A1* | 11/2019 | Tsuyuzaki | B60K 1/04 | |
| 2020/0031399 A1* | 1/2020 | Matsuda | B62D 21/03 | |
| 2020/0148269 A1* | 5/2020 | Amrit | B62D 25/2009 | |

FOREIGN PATENT DOCUMENTS

| | | | | |
|---|---|---|---|---|
| JP | 2017-226353 | | 12/2017 | |
| WO | WO 2017/207502 | * | 12/2017 | B60K 1/04 |

* cited by examiner

VEHICLE BODY LOWER STRUCTURE

CROSS-REFERENCE TO RELATED APPLICATION

Priority is claimed on Japanese Patent Application No. 2018-100965, filed May 25, 2018, the content of which is incorporated herein by reference.

BACKGROUND OF THE INVENTION

Field of the Invention

The present invention relates to a vehicle body lower structure.

Description of Related Art

In the related art, for a vehicle body lower structure, for example, a configuration in which a floor panel bridges between left and right side sills and a battery pack is mounted below the floor panel is known. A battery is accommodated in the battery pack. The battery in the battery pack needs to be protected from a load input from a side of a vehicle.

For example, Japanese Unexamined Patent Application, First Publication No. H07-246842 discloses a vehicle body lower structure in which a battery pack (a battery carrier) is disposed below a floor panel, and left and right side edge portions of the battery pack extend outward in a vehicle width direction and are fixed to vehicle body left and right side sills. When an impact load is input to the vehicle from a side, a battery can be protected from an impact by receiving some of the impact energy using left and right side edge portions of the battery pack.

SUMMARY OF THE INVENTION

In the vehicle body lower structure disclosed Japanese Unexamined Patent Application, First Publication No. H07-246842, left and right side edge portions of the battery pack extend in a vehicle width direction and are fixed to left and right side sills. However, when a structure configured to fix the left and right side sills to the battery pack is formed integrally, it is difficult to manufacture the battery pack. For this reason, it is conceivable that a battery side frame configured to fix the battery pack to the left and right side sills be formed separately from the battery pack and a battery frame thereof be fixed to the corresponding left and right side sills and the battery pack.

However, in this case, the length from the fixing points of the battery side frame with respect to the side sills to the fixing points below the battery pack becomes longer, and when an impact load is input to the vehicle from the side, there is concern that a large detachment load may act on the fixing points below the battery side frame and the battery pack.

An aspect of the present invention is directed to providing a vehicle body lower structure capable of stably holding a battery pack using a structure in which it is difficult for a large detachment load to be applied to a battery side frame fixed to side sills.

(1) A vehicle body lower structure according to the present invention includes a battery pack provided below a floor panel; a pair of left and right side sills provided on a vehicle body side portion; and a battery side frame that extends between the side sills and the battery pack in a forward/rearward direction and that is configured to support the battery pack, wherein the battery side frame has: a first attachment member fixed to the side sills; and a second attachment member that is coupled to the battery pack and that constitutes a closed cross section between the first attachment member and the battery pack, and the first attachment member has an outer fixing point fixed to the side sills and an inner fixing point fixed to a wall that constitutes the closed cross section of the second attachment member.

(2) In the aspect of the above-mentioned (1), the second attachment member may have an extended installation section extending from a lower wall that constitutes the closed cross section toward the battery pack, and the extended installation section may be fixed to the battery pack.

(3) In the aspect of the above-mentioned (2), the second attachment member may form the closed cross section using an outer plate disposed outside in the vehicle width direction; and an inner plate disposed inside in the vehicle width direction, the outer plate and the inner plate may have the extended installation sections, respectively, and the extended installation sections of the outer plate and the inner plate may overlap each other and may be fixed to the battery pack.

(4) In the aspect of any one of the above-mentioned (1) to (3), a battery cross member extending inside the battery pack in the vehicle width direction may be provided, and the second attachment member may be fixed to the battery pack below the battery cross member.

(5) In the aspect of any one of the above-mentioned (1) to (4), a lower surface section of the first attachment member may have an inclined section inclined downward as it goes inward in the vehicle width direction.

According to the aspect of the above-mentioned (1), in the first attachment member, since the outer side portion in the vehicle width direction is fixed to the side sills at the outer fixing points and the inner side portion in the vehicle width direction is fixed to the second attachment member at the inner fixing point, the length of the first attachment member in the vehicle width direction is reduced. Accordingly, when an impact load is input from a side of the vehicle, a moment of a force applied to the inner fixing point of the first attachment member is reduced. Accordingly, in the configuration in which the side sills and the battery pack are fixed via the battery side frame, exfoliation of the inner fixing point from the second attachment member can be suppressed.

In addition, the first attachment member is fixed to the closed cross-sectional portion of the second attachment member in which a strength is high and deformation is hard to occur when an impact load is input from a side of the vehicle or the like. A load received upon side collision is supported by the closed cross section. Accordingly, the first attachment member can be prevented from directly abutting the battery pack, and the battery pack can be stably held.

According to the aspect of the above-mentioned (2), the extended installation section extending from a lower section of the closed cross section of the second attachment member is provided, and the extended installation section is fixed to the battery pack.

Accordingly, strength of the closed cross section can be improved, and a shape of the closed cross section when an impact load is input from a side of the vehicle can be prevented from being collapsed. Accordingly, the battery pack can be protected from an impact from a side of the vehicle.

According to the aspect of the above-mentioned (3), the second attachment member is fixed to the battery pack at a position where the outer plate and the inner plate that form the closed cross section overlap each other.

Accordingly, since three members including the lower surface, the inner plate and the outer plate of the battery pack overlap each other and are fixed to each other at the fixing points of the second attachment member to the battery pack, a fixing strength is increased. Accordingly, when an impact load is input from a side of the vehicle, it is difficult for the fixing points of the second attachment member to become detached from the battery pack, and the battery pack can be stably held.

According to the aspect of the above-mentioned (4), the second attachment member is fixed to the battery pack at below the battery cross member.

Accordingly, an impact load input from a side of the vehicle is efficiently transmitted from the second attachment member to the battery cross member via the fixing points between the second attachment member and the battery pack. Accordingly, since the impact load can be supported by the battery cross member, deformation of the battery pack can be inhibited. In addition, since the second attachment member is fixed below the battery pack, when an input load is input from a side of the vehicle, a direction of a load that acts on the fixing points of the battery pack is an upward direction with respect to the vehicle. Accordingly, a load can be efficiently transmitted to the battery cross member that is present above the fixing points.

According to the aspect of the above-mentioned (5), the lower surface section of the first attachment member is inclined.

Accordingly, when an impact load is input from a side of the vehicle, since the inclined section is more likely to collapse at the beginning, a load is efficiently absorbed by the first attachment member. For this reason, an exfoliation load applied to the inner fixing point is reduced. Accordingly, detachment of the inner fixing points of the first attachment member from the second attachment member can be inhibited, and the battery pack can be stably held.

DETAILED DESCRIPTION OF THE INVENTION

Hereinafter, an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle.

Figure 1:
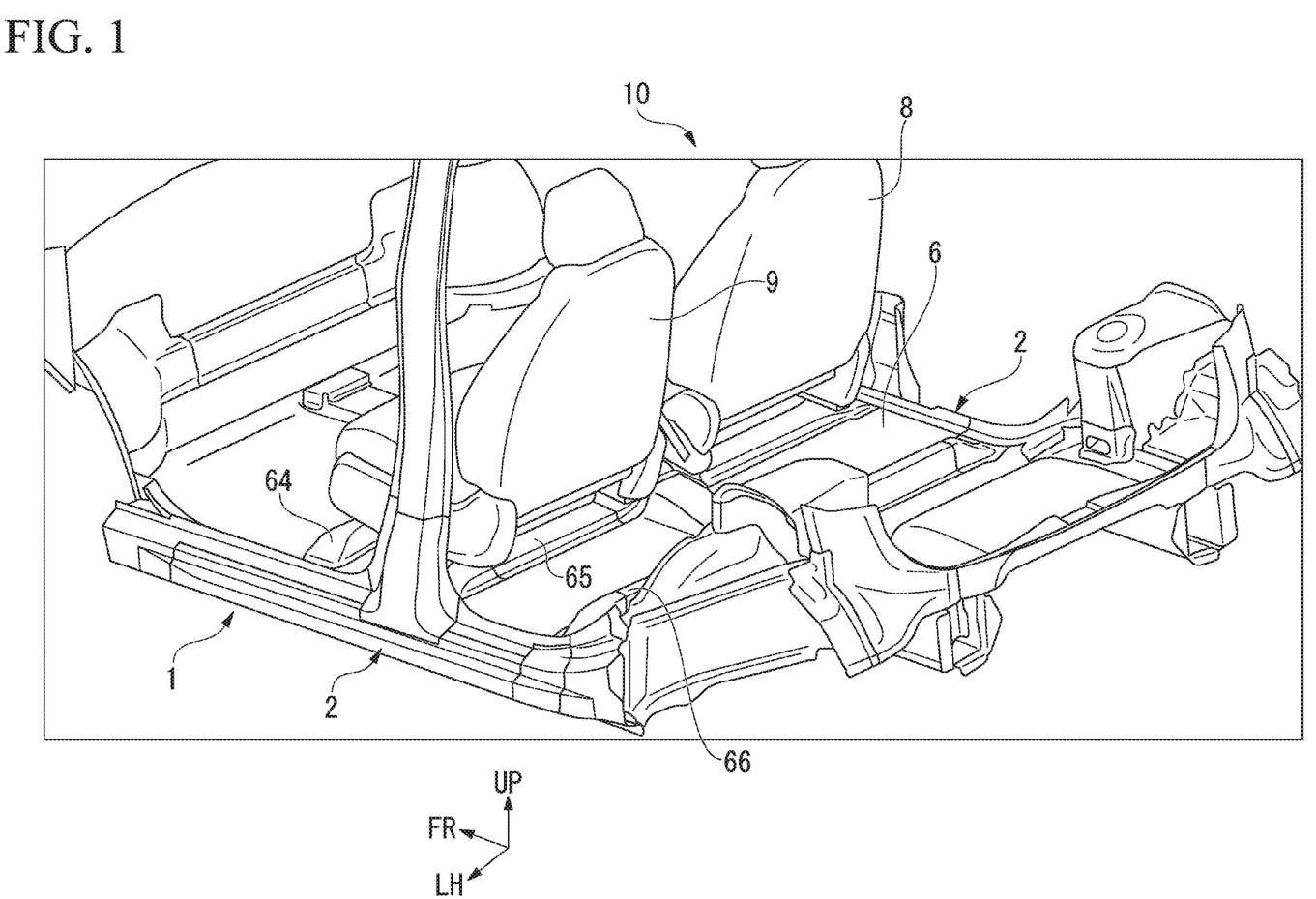
FIG. 1 is a perspective view of a vehicle body lower structure according to an embodiment of the present invention.
Figure 2:
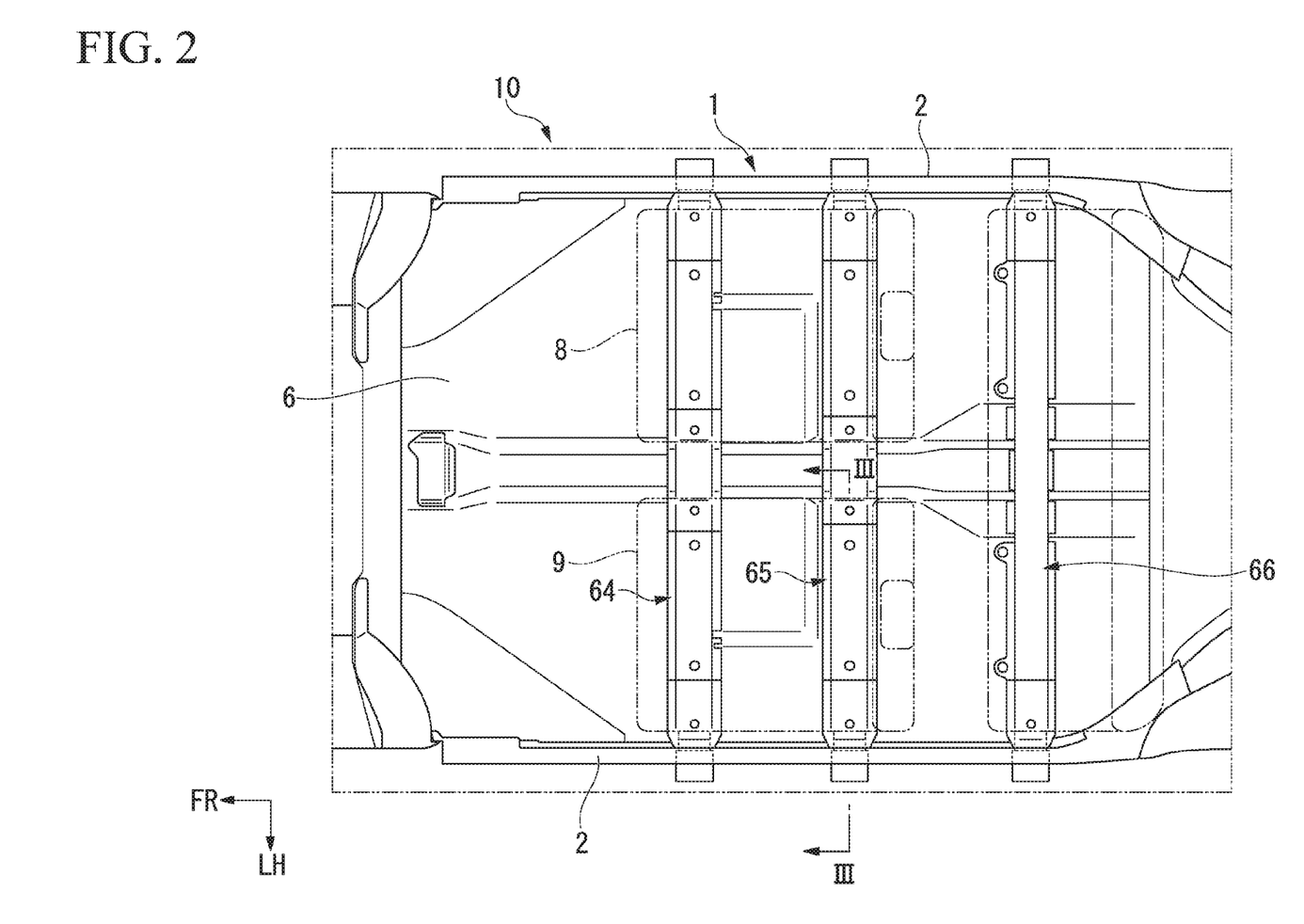
FIG. 2 is a plan view from which some parts of the vehicle body lower structure according to the embodiment of the present invention are removed.

FIG. 1 is a perspective view of a vehicle body lower structure according to the embodiment, and FIG. 2 is a view showing the vehicle body lower structure from above.

A vehicle body lower structure 1 is a structure disposed at a lower side of a vehicle 10, and includes a pair of side sills 2 disposed at left and right side portions of a lower end side of a vehicle body and extending in a substantially forward/rearward direction of the vehicle body.

The vehicle body lower structure 1 includes the pair of side sills 2 that are strength members of a vehicle body side portion, a floor panel 6 having both end portions in a vehicle width direction that bridge between the left and right side sills 2, a plurality of floor cross members 64, 65 and 66 disposed on an upper surface side of the floor panel 6, a battery pack 3 (see FIG. 3) provided below the floor panel 6, and a battery side frame 4 (see FIG. 3) disposed between the side sills 2 and the battery pack 3. In the case of the embodiment, a driver seat 8 installed in a passenger compartment and installation sections in front of and behind a passenger seat 9 are attached to the two front floor cross members 64 and 65.

All of the floor cross members 64, 65 and 66 extend substantially parallel to the vehicle width direction, and both end portions in an extension direction are coupled to the left and right side sills 2. The floor cross members 64, 65 and 66 are disposed to be separated from each other in a vehicle body forward/rearward direction.

(Side Seals)

Figure 3:
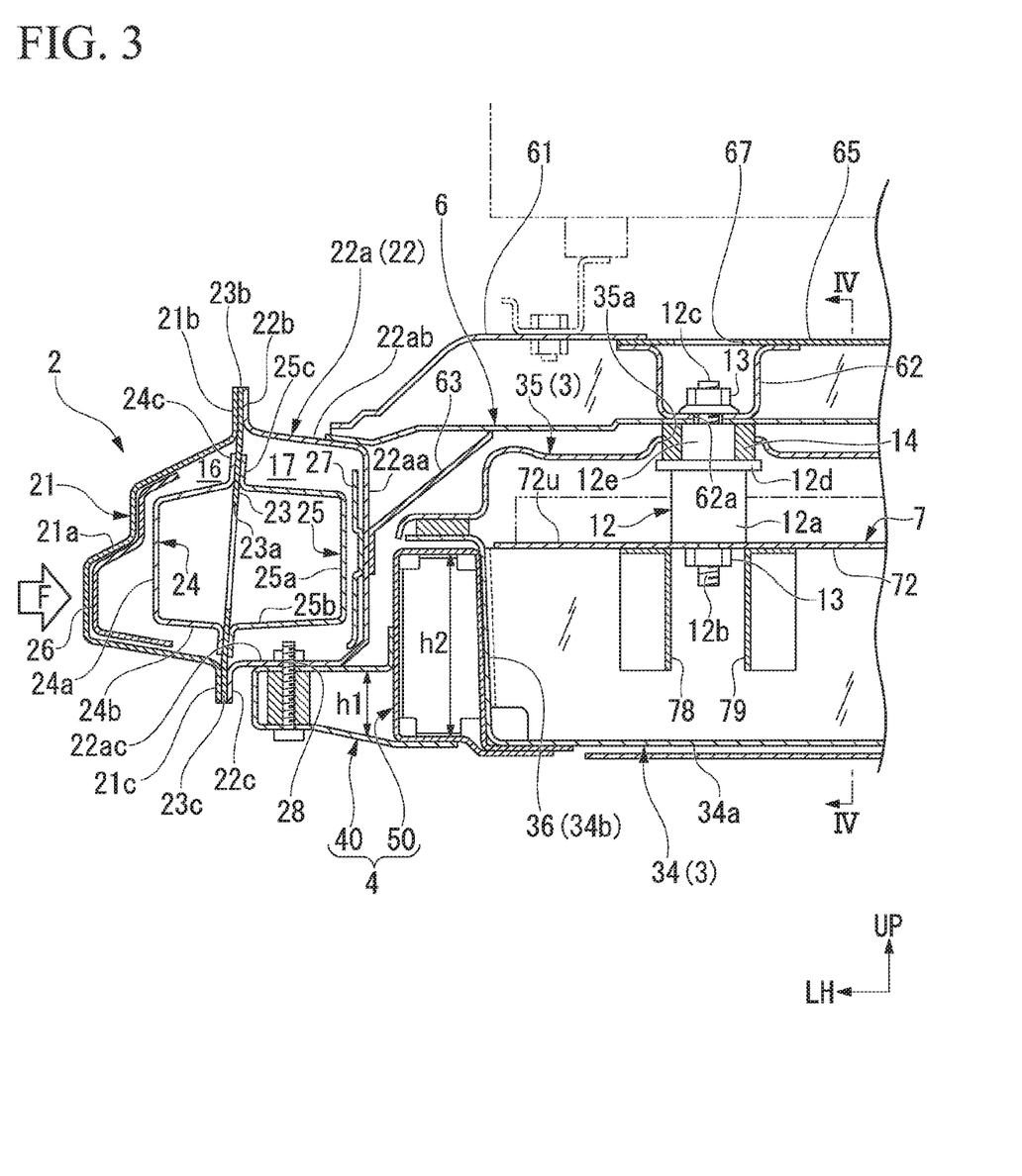
FIG. 3 is a cross-sectional view of the vehicle body lower structure according to the embodiment of the present invention taken along line in FIG. 2.

FIG. 3 is a view showing a cross section of the vehicle body lower structure taken along line in FIG. 2. Further, since the vehicle body lower structure 1 is constituted by a substantially symmetrical member, hereinafter, components on a left side will be described and description of components on a right side will be omitted.

The side sill 2 includes a side sill outer portion 21, a side sill inner portion 22 and a stiffener 23.

The side sill outer portion 21 is provided on an outer side in the vehicle width direction. The side sill outer portion 21 has an outer projecting section 21a, an upper flange 21b and a lower flange 21c. The outer projecting section 21a projects outward from the upper flange 21b and the lower flange 21c in the vehicle width direction. An outer reinforcement member 26 is attached to an inner surface of the outer projecting section 21a. The upper flange 21b overhangs upward from an upper end of the outer projecting section 21a. The lower flange 21c overhangs downward from a lower end of the outer projecting section 21a.

The side sill inner portion 22 is provided on an inner side with respect to the side sill outer portion 21 in the vehicle width direction. The side sill inner portion 22 has an inner projecting section 22a, an upper flange 22b and a lower flange 22c. The inner projecting section 22a overhangs inward from the upper flange 22b and the lower flange 22c in the vehicle width direction. The inner projecting section 22a is formed in a U-shaped cross section by an inner wall 22aa, an upper wall 22ab and a lower wall 22ac. An inner reinforcement member 27 is attached to an inner surface of the inner projecting section 22a. The upper flange 22b overhangs upward from an outer end of the upper wall 22ab. The lower flange 22c overhangs downward from an outer end of the lower wall 22ac.

In addition, a battery side frame fixing hole 28 is formed in the lower wall 22ac.

The stiffener 23 is interposed between the side sill outer portion 21 and the side sill inner portion 22. The stiffener 23 is formed in a flat plate shape and interposed between the side sill outer portion 21 and the side sill inner portion 22. Specifically, an upper side section 23b of the stiffener 23 is joined to the upper flange 21b of the side sill outer portion 21 and the upper flange 22b of the side sill inner portion 22 while being interposed therebetween. In addition, a lower side section 23c of the stiffener 23 is joined to the lower flange 21c of the side sill outer portion 21 and the lower flange 22c of the side sill inner portion 22 while being interposed therebetween. That is, the stiffener 23 is sandwiched between the side sill outer portion 21 and the side sill inner portion 22.

In this way, the side sill 2 is formed in an appearance of a substantially rectangular frame by the side sill outer portion 21 and the side sill inner portion 22. The stiffener 23 disposed at substantially a center of the rectangular frame divides the space surrounded by the rectangular frame into two. Specifically, an outer space 16 is formed between the side sill outer portion 21 and the stiffener 23. In addition, an inner space 17 is formed between the side sill inner portion 22 and the stiffener 23.

An outer bulkhead 24 is disposed in the outer space 16 between the side sill outer portion 21 and the stiffener 23. The outer bulkhead 24 has a bottom surface 24a having a rectangular shape, side surfaces 24b configuring four sides, and four joining flanges 24c extending from the side surfaces 24b. One end portions of the side surfaces 24b (end portions of sides away from the stiffener 23) are closed by the bottom surface 24a. The other end portions of the side surfaces 24b (end portions on the stiffener 23 side) open in a rectangular shape. The joining flanges 24c are provided over the entire circumference of the opening section at end portions of the side surfaces 24b on the opening section side. In addition, the joining flanges 24c are disposed in contact with the stiffener 23. In this way, the outer bulkhead 24 is formed in a cup shape projecting outward in the vehicle width direction by the bottom surface 24a, the side surfaces 24b and the joining flanges 24c.

An inner bulkhead 25 is disposed in the inner space 17 between the side sill inner portion 22 and the stiffener 23. The inner bulkhead 25 has a bottom surface 25a having a rectangular shape, side surfaces 25b configured from four sides, and four joining flanges 25c extending from the side surfaces 25b. One end portions of the side surfaces 25b (end portions of sides separated from the stiffener 23) are closed by the bottom surface 25a. The other end portions of the side surfaces 25b (end portions on the stiffener 23 side) are opened in a rectangular shape. The joining flanges 25c are provided on the entire circumference of the opening section at end portions of the side surfaces 25b on the opening section side. In addition, the joining flanges 25c are disposed while coming in contact with the stiffener 23. In this way, the inner bulkhead 25 is formed in a cup shape projecting inward in the vehicle width direction by the bottom surface 25a, the side surfaces 25b and the joining flanges 25c.

In a state in which the joining flanges 24c of the outer bulkhead 24 come in contact with a surface of the stiffener 23 directed to an outer side in the vehicle width direction and the joining flanges 25c of the inner bulkhead 25 come in contact with a surface of the stiffener 23 directed to an inner side in the vehicle width direction, the joining flanges 24c and the joining flanges 25c overlap each other via the stiffener 23. Accordingly, the outer bulkhead 24 and the inner bulkhead 25 are attached to the stiffener 23 while overlapping each other in the vehicle width direction. The plurality of outer bulkheads 24 and the plurality of inner bulkheads 25 are disposed at intervals in the forward/rearward direction.

Incidentally, the stiffener 23 has hole sections 23a. The hole sections 23a are formed in areas corresponding to an opening section of the outer bulkhead 24 and an opening section of the inner bulkhead 25. That is, the plurality of hole sections 23a are disposed at intervals in the forward/rearward direction. Since the hole sections 23a are formed in the stiffener 23, when electrodeposition coating is performed inside the side sills 2, electrodeposition paint can be appropriately guided into the side sills 2 using the hole sections 23a. Accordingly, the electrodeposition paint can be easily adhered to the inside of the side sills 2.

In addition, since the hole sections 23a are formed in the stiffener 23, the stiffener 23 can be reduced in weight, and reduction in weight of the vehicle 10 can be achieved.

(Floor Panel)

Next, the floor panel 6 and sections surrounding thereof will be described.

The floor cross member 65 includes a cross plate 61 joined to an upper surface of the floor panel 6 and forming a closed cross section extending between the floor panel 6 and the cross plate 61 substantially in the vehicle width direction, and a gusset plate 63 that bridges between a lower surface of an end region of the floor panel 6 in the vehicle width direction and an inner surface of the side sill 2 and forming a closed cross section extending between the floor panel 6 and the gusset plate 63 substantially in the vehicle width direction. The cross plate 61 is formed in a substantially hat-shaped cross section, and both end portions in the vehicle width direction are joined to upper surfaces of the left and right side sills 2. Further, in the embodiment, the cross plate 61 is constituted by joining a plurality of plate members to each other.

An upper wall of an end region of the cross plate 61 in the vehicle width direction is inclined downward going outward in the vehicle width direction. Accordingly, the closed cross section formed by the cross plate 61 and the upper surface of the floor panel 6 has an internal opening area that narrows gradually outward in the vehicle width direction. In addition, similarly, a lower wall of the gusset plate 63 is also inclined downward as it goes outward in the vehicle width direction. Accordingly, the closed cross section formed by the gusset plate 63 and the lower surface of the floor panel 6 has an internal opening area that widens gradually outward in the vehicle width direction.

The floor cross member 65 has a central region in the vehicle width direction that is formed to stand upward with respect to the side sills 2. However, in the floor cross member 65, according to the above-mentioned configuration, a closed cross section of a central region formed by the floor panel 6 and the cross plate 61 and an inclined closed cross section of an end region formed by the cross plate 61 and the gusset plate 63 have a substantially constant cross-sectional area and are connected to each other.

(Battery Pack)

As shown in FIG. 3, the battery pack 3 is disposed below the floor panel 6 and between the left and right side sills 2. The battery pack 3 includes a battery case 34 that opens upward, and a case cover 35 configured to cover an opening of an upper section of the battery case 34.

The battery case 34 includes a bottom wall 34a having a rectangular shape when seen in a plan view, and a circumferential wall 34b standing upward from a circumferential region of the bottom wall 34a. Portions of the circumferential wall 34b standing upward from left and right end portions are referred to as case sidewalls 36 as described below.

A plurality of batteries (not shown) and a plurality of battery cross members 7 extending substantially in the vehicle width direction to partition the inside of the battery pack 3 into front and rear sections are disposed in the battery pack 3. In the case of the embodiment, three battery cross members 7 are provided (see FIG. 5). The battery cross members 7 are disposed immediately below the floor cross members 64, 65 and 66 on the floor panel 6. The three floor cross members 64, 65 and 66 and the battery cross members 7 are disposed substantially parallel to each other.

The floor cross members 64, 65 and 66 and the cross sections including the battery cross members 7 corresponding thereto (the cross sections substantially perpendicular to the forward/rearward direction of the vehicle), respectively, have substantially the same structure.

For this reason, hereinafter, a cross-sectional structure of the vehicle body lower structure 1 will be described as a representative of a cross section including the floor cross member 65 at a center in the forward/rearward direction and the battery cross members 7 therebelow. Further, while the battery cross members 7 of the embodiment become a dual structure (see FIG. 6) in actuality, the battery cross members 7 are simplified and shown in FIG. 3 and FIG. 4.

Figure 4:
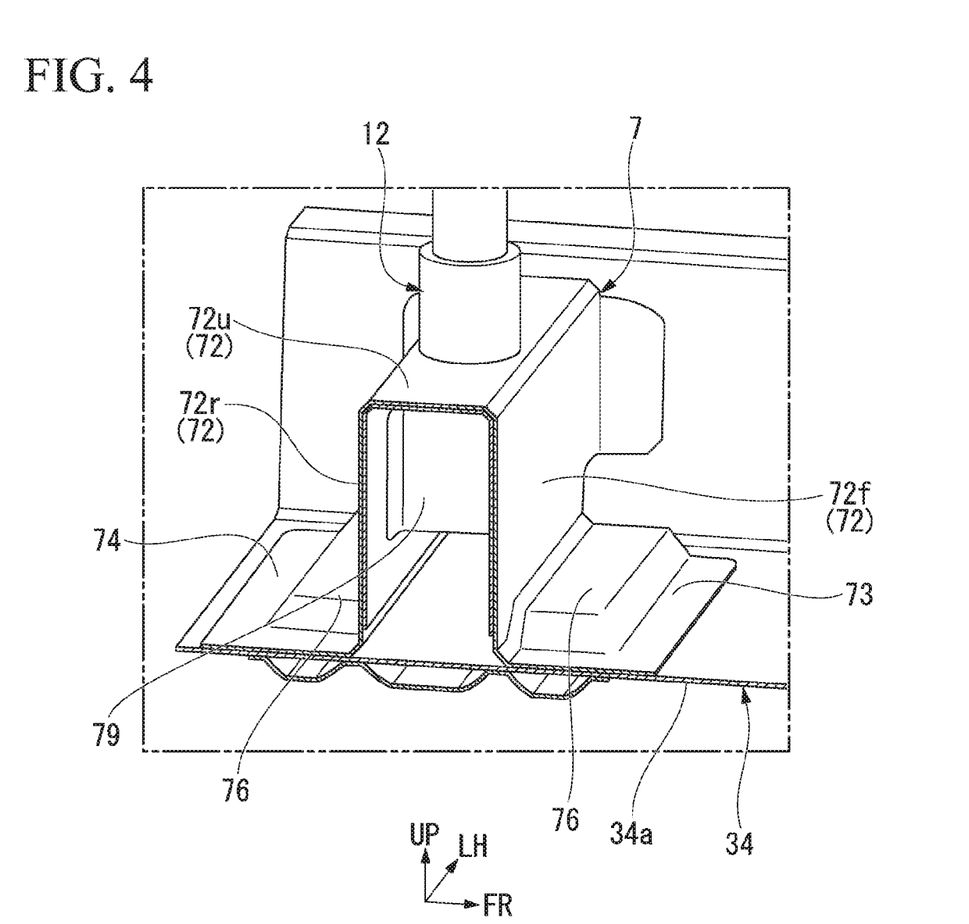
FIG. 4 is a perspective view of a battery cross member according to the embodiment of the present invention.

FIG. 4 is a perspective view of the battery cross member.

Each of the battery cross members 7 includes a member main body section 72 formed in a substantially C-shaped cross section standing upward, having a front side 72f, an upper side 72u and a rear side 72r, and a forward overhanging seat 73 overhanging forward from a lower edge of the front side 72f, and a rearward overhanging seat 74 overhanging rearward from a lower edge of the rear side 72r.

Returning to FIG. 3, a plurality of stud bolts 12 that are fastening members disposed at intervals in the vehicle width direction are coupled to the upper sides 72u of the battery cross members 7. The upper side 72u is coupled to the corresponding upper floor cross member 65 by the stud bolts 12.

Each of the stud bolts 12 has a central drum section 12a having a columnar shape, a lower screw section 12b projecting downward from a lower surface of the drum section 12a, and an upper screw section 12c projecting upward from an upper surface of the drum section 12a.

In the battery cross member 7, a lower end of the stud bolt 12 is coupled to the upper side 72u of the member main body section 72. The stud bolt 12 is fixed to the battery cross member 7 when a nut 13 is screwed to the screw section 12b passing through the upper side 72u of the member main body section 72 from above to below. In addition, in each of the stud bolts 12, the screw section 12c passing through the floor panel 6 from below to above further passes through a bracket 62 of the floor cross member 65 from above to below, and the nut 13 is threaded to the screw section 12c. Accordingly, the upper section of the stud bolt 12 is fixed to the floor cross member 65.

The bracket 62 is a metal member having a substantially hat-shaped cross section that functions as a cross section reinforcement section of the floor cross member 65. In the bracket 62, a portion corresponding to a hat-shaped brim section is joined to a lower surface of an upper wall of the floor cross member 65, and an insertion hole 62a into which the screw section 12c of the stud bolt 12 is inserted is formed in a portion corresponding to a hat-shaped apex section. The bracket 62 is welded to the upper wall of the floor cross member 65 such that the hat-shaped apex section is directed downward. In the upper wall of the floor cross member 65, a working hole 67 configured to fasten the nut 13 to the screw section 12c projecting upward from the insertion hole 62a is formed in an area opposite to the insertion hole 62a of the bracket 62.

Further, a support flange 12d and a small shaft section 12e projecting upward from the support flange 12d are provided on the upper end of the drum section 12a of the stud bolt 12. A cylindrical elastic seal member 14 having a large thickness is fitted onto the shaft section 12e. A support groove is provided in an outer circumferential surface of the elastic seal member 14, and the support groove is locked to a circumferential edge portion of a through-hole 35a of the case cover 35. The drum section 12a of the stud bolt 12 is held by the through-hole 35a of the case cover 35 via the elastic seal member 14. In addition, the lower surface of the elastic seal member 14 abuts the upper surface of the support flange 12d, and the upper surface of the elastic seal member 14 abuts the lower surface of the floor panel 6.

In addition, in the battery cross member 7, a first partition wall member 78 and a second partition wall member 79 are provided in front of and behind an installation section of each of the stud bolts 12 in an extension direction of the battery cross members 7. Both of the first partition wall member 78 and the second partition wall member 79 also have joining flanges (not shown), and are fixed to at least three surfaces of the front side 72f, the upper side 72u, and the rear side 72r of the battery cross members 7 through welding or the like.

Incidentally, as shown in FIG. 4, the battery cross member 7 has the forward overhanging seat 73 overhanging forward from a lower edge of the front side 72f of the member main body section 72, and the rearward overhanging seat 74 overhanging rearward from a lower edge of the rear side 72r of the member main body section 72. That is, the member main body section 72, the forward overhanging seat 73 and the rearward overhanging seat 74 are formed in an inverted T-shaped cross-sectional shape.

In addition, a pedestal section 76 having a flat upper surface and projecting upward with respect to the bonding surface of the circumferential edge to the bottom wall 34a is provided on a part of a root section side of the forward overhanging seat 73 and the rearward overhanging seat 74 of the battery cross member 7 (a side continuously provided on the member main body section 72). A battery (not shown) can be placed on an upper surface of the pedestal section 76. In addition, a lower surface side of the pedestal section 76 communicates with an internal space of the member main body section 72.

(Battery Side Frame)

Figure 5:
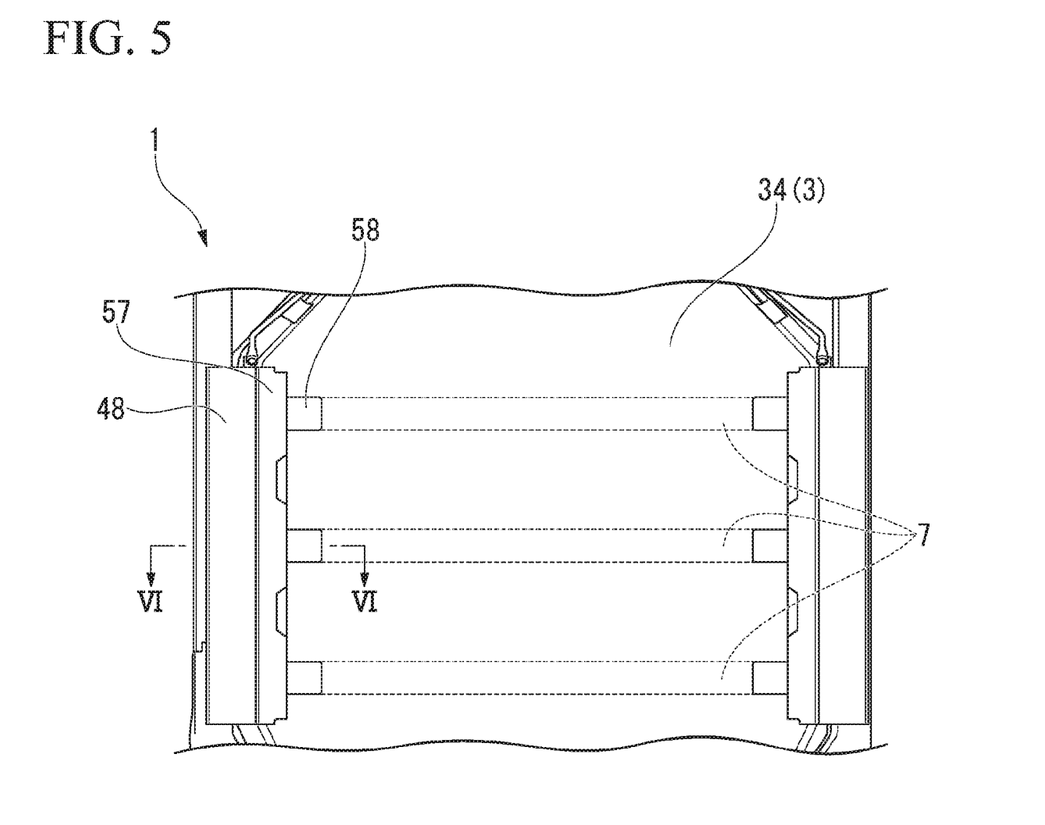
FIG. 5 is a bottom view of the vehicle body lower structure according to the embodiment of the present invention.

FIG. 5 is a bottom view of the vehicle body lower structure. In addition, FIG. 6 is a cross-sectional view taken along line VI-VI in FIG. 5, showing the battery side frame 4 in detail.

The battery side frame 4 is disposed in a space between the side sills 2 and the battery pack 3 and extends in the forward/rearward direction. The battery side frame 4 has a first attachment member 40 and a second attachment member 50. The first attachment member 40 is disposed in the forward/rearward direction on an outer side in the vehicle width direction and fixed to the side sills 2. The second attachment member 50 is disposed in the forward/rearward direction on an inner side in the vehicle width direction, is joined to the first attachment member 40 and supports the battery pack 3. When seen in a cross section perpendicular to the forward/rearward direction, the second attachment member 50 has a closed cross section between the first attachment member 40 and the battery pack 3.

Here, the battery side frame 4 is constituted by left and right symmetrical members, and hereinafter, the battery side frame 4 on a left side will be described, and detailed description of the battery side frame 4 on a right side will be omitted.

Figure 6:
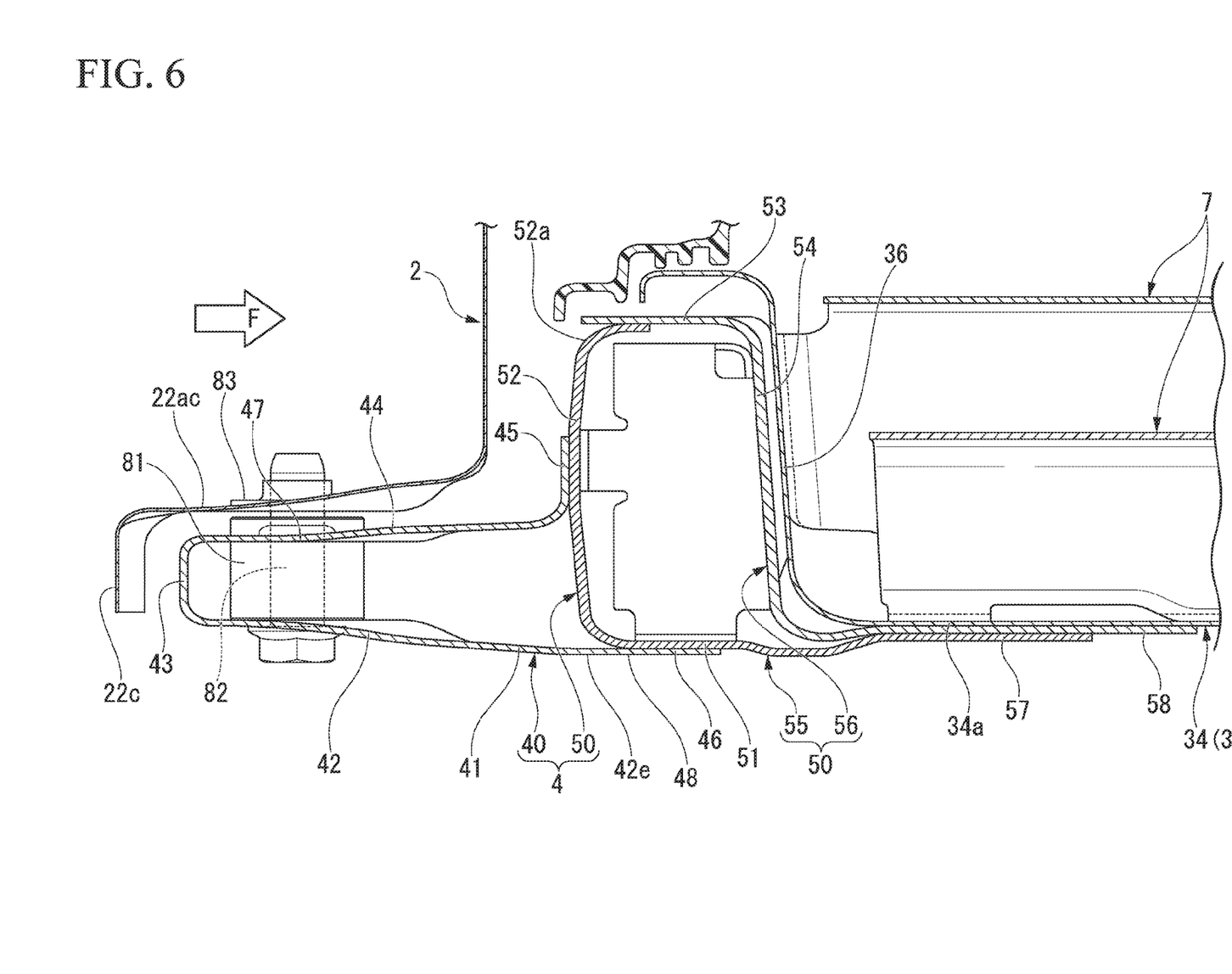
FIG. 6 is a cross-sectional view of the vehicle body lower structure according to the embodiment of the present invention taken along line VI-VI in FIG. 5.

As shown in FIG. 6, the first attachment member 40 is attached to the lower wall 22ac of the side sill inner portion 22. The first attachment member 40 has a lower surface section 41, a side surface section 43, an upper surface section 44 and a flange surface section 45. The first attachment member 40 is formed in a C shape having an opening inside in the vehicle width direction by the lower surface section 41, the side surface section 43 and the upper surface section 44. The flange surface section 45 is formed to extend upward from an end portion of the upper surface section 44 on the opening side.

The upper surface section 44 is fixed to the lower wall 22ac of the side sill inner portion 22 at an upper surface thereof. In addition, the upper surface section 44 has an outer fixing point 47 fixed to the side sills 2. Holes through which a bolt 82 passes are formed in the upper surface section 44 corresponding to the outer fixing point 47 and the lower wall 22ac of the side sill 2, and the bolt 82 passes therethrough.

A collar 81 is interposed in the first attachment member 40 corresponding to the outer fixing point 47, and the bolt 82 passes through the collar 81. The first attachment member 40 is attached to the side sills 2 by the bolt 82 and an attachment nut 83 at the outer fixing point 47.

The side surface section 43 extends downward from an outer end of the upper surface section 44. The lower surface section 41 extends from the lower end of the side surface section 43 toward an inner side in the vehicle width direction. The lower surface section 41 has an extension section 48 formed in an opening-side end portion and having a length in the vehicle width direction larger than that of the upper surface section 44. The extension section 48 extends toward the bottom wall 34a of the battery case 34, and terminates on a further outer side in the vehicle width direction than the case sidewalls 36. The extension section 48 has an inner fixing point 46 to which the second attachment member 50 is fixed.

The lower surface section 41 has a hole, through which the bolt 82 that joins the side sills 2 and the first attachment member 40 passes, formed on a side of the side surface section 43 corresponding to the outer fixing point 47 of the upper surface section 44, and the bolt 82 passes through the hole. That is, the bolt 82 passes from the lower wall 22ac of the side sill inner portion 22 to the lower surface section 41.

In addition, the lower surface section 41 has an inclined section 42 on a side of the side surface section 43. The inclined section 42 is inclined downward as it goes from the side surface section 43 toward an inner side in the vehicle width direction. An inclination terminal section 42e of the inclined section 42 terminates at a position corresponding to an outer wall 52 of the second attachment member 50, which will be described below, in the vehicle width direction. The plurality of inclined sections 42 are formed at intervals in the forward/rearward direction so as to avoid the holds through which the bolt 82 passes.

The second attachment member 50 stands upward from the first attachment member 40, and is disposed to face the side sill inner projecting section 22a of the side sill inner portion 22 between the side sill inner portion 22 and the battery pack 3. The second attachment member 50 forms a closed cross section using an outer plate 55 disposed on an outer side in the vehicle width direction and an inner plate 56 disposed on an inner side in the vehicle width direction.

A height h2 of the second attachment member 50 in the upward/downward direction is larger than a height h1 of the first attachment member 40 in the upward/downward direction, and the second attachment member 50 having a sufficient height for attachment is joined to the battery pack 3.

The outer plate 55 is an L-shaped metal plate member, and has a lower wall 51 and the outer wall 52.

An outer surface of the outer wall 52 is joined to the flange surface section 45 of the first attachment member 40. In addition, the lower wall 51 is joined to the inner fixing point 46 in the extension section 48 of the first attachment member 40 through welding. The extension section 48 and the lower wall 51 come in contact with each other. The lower wall 51 has the first extended installation section 57 extending to wrap around a lower surface side of the bottom wall 34a of the battery case 34 at the end portion. In addition, the upper end portion of the outer wall 52 has a bent section 52a that is bent inward in the vehicle width direction.

The inner plate 56 has an upper sidewall 53, an inner sidewall 54 and a second extended installation section 58. Here, the second attachment member 50 is formed in a rectangular cross-sectional frame shape by the upper sidewall 53, the inner sidewall 54, and the lower wall 51 and the outer wall 52 of the outer plate 55. In other words, the closed cross section is formed by the outer plate 55 and the inner plate 56.

The inner sidewall 54 of the inner plate 56 is joined to face the case sidewall 36 of the battery case 34 and along the case sidewall 36. The lower end of the inner sidewall 54 is bent inward in the vehicle width direction, and the second extended installation section 58 is formed in front of the bent section. The second extended installation section 58 overlaps the lower surface of the bottom wall 34a of the battery case 34 and is joined to the lower surface of the bottom wall 34a. Further, a first extended installation section 57 is made to overlap this lower surface of the bottom wall 34a. That is, the bottom wall 34a, the second extended installation section 58 and the first extended installation section 57 are joined to each other through welding in a state of, for example, three-layer overlapping.

The upper sidewall 53 extends from the upper end of the inner sidewall 54 toward the side sill 2. An upper end of the outer wall 52 of the outer plate 55 is joined to the lower surface of the upper sidewall 53. Here, the upper sidewall 53 and the outer wall 52 come in surface contact with each other using the bent section 52a of the outer wall 52.

In addition, as shown in FIG. 5 and FIG. 6, the battery cross members 7 are disposed above places where the first extended installation section 57 and the second extended installation section 58 are joined to the bottom wall 34a. In other words, the second attachment member 50 is fixed to the battery pack 3 below the battery cross members 7. Specifically, the first extended installation section 57 and the second extended installation section 58 of the second attachment member 50 are attached to the bottom wall 34a of the battery case 34 in the end regions of the battery cross members 7 in the vehicle width direction.

(Actions and Effects of Vehicle Body Lower Structure)

As described above, the vehicle body lower structure 1 according to the embodiment has the battery side frame 4 constituted by first attachment member 40 and the second attachment member 50 between the side sills 2 and the battery pack 3. Here, when an impact load F is input to the side sills 2 from sides of the vehicle, the impact load F is divided into a first load transmitted to the gusset plate 63, the cross plate 61, or the like, and a second load transmitted toward the side of the battery pack 3 via the battery side frame 4, after via the side sills 2. Hereinafter, the second load is referred to as an impact load F, and actions and effects of the battery side frame 4 will be described.

The impact load F is transmitted to the first attachment member 40 via the bolt 82 fixed to the side sill 2, and then, a force is transmitted from the outer fixing point 47 toward the inner fixing point 46. Here, since the inner fixing point 46 is fixed to the lower wall 51 of the second attachment member 50, in comparison with the case in which the inner fixing point 46 is directly fixed to the battery pack 3, a distance from the outer fixing point 47 to the inner fixing point 46 is reduced. That is, a length of the first attachment member 40 in the vehicle width direction is minimized to a small size. Accordingly, when the impact load F is input from a side of the vehicle, a moment of a force applied to the inner fixing point 46 is reduced. Accordingly, an exfoliation load applied to the inner fixing point 46 can be reduced, and exfoliation of the inner fixing point 46 from the second attachment member 50 can be suppressed. In addition, the height h1 of the first attachment member 40 is smaller than the height h2 of the second attachment member 50, and an exfoliation load with respect to the impact load F from a side of the vehicle easily occurs. For this reason, in particular, when the length of the first attachment member 40 in the vehicle width direction is minimized to a small size, occurrence of an exfoliation load can be more effectively minimized.

Further, the first attachment member 40 has the inclined section 42 inclined downward in the lower surface section 41 as it goes inward in the vehicle width direction. For this reason, when an impact load is input from a side of the vehicle, the inclined section 42 is more likely to collapse at the beginning. Specifically, the side surface section 43, the upper surface section 44 and the inclined section 42 (the lower surface section 41) of the first attachment member 40 are collapsed toward the inside of the space surrounded by a C shape of the first attachment member 40 and the outer wall 52 of the second attachment member 50. Accordingly, the impact load F input from a side of the vehicle is efficiently absorbed by the first attachment member 40, and an exfoliation load applied to the inner fixing point 46 is reduced. Accordingly, exfoliation of the inner fixing point 46 of the first attachment member from the second attachment member 50 can be suppressed, and the battery pack 3 can be stably held.

In addition, the impact load F input from a side of the vehicle is transmitted to the second attachment member 50 via the flange surface section 45 and the extension section 48 of the first attachment member 40. Here, the second attachment member 50 has a closed cross section in which strength is high and deformation is hard to occur when an impact load is input from a side of the vehicle or the like, and the first attachment member 40 is fixed to the closed cross-sectional portion. Accordingly, the impact load F is supported by the closed cross section. Accordingly, the first attachment member 40 can be prevented from directly abutting the battery pack 3, and the battery pack 3 can be stably held.

In addition, the lower wall 51 that constitutes the closed cross section has the first extended installation section 57, and the first extended installation section 57 is fixed to the battery pack 3. Accordingly, strength of the closed cross section can be improved, and a shape of the closed cross section can be prevented from being collapsed when the impact load F is input from a side of the vehicle. Accordingly, the battery pack 3 can be protected from the impact load F.

Further, since the outer plate 55 and the inner plate 56 that constitute the closed cross section are fixed to the battery pack 3 at a position whether they overlap each other, fixing strength is increased. Accordingly, when the impact load F is input from a side of the vehicle, the fixing points of the second attachment member 50 are hard to be exfoliated from the battery pack 3, and the battery pack 3 can be stably held.

In addition, since the second attachment member 50 is fixed to the battery pack 3 below the battery cross members 7, the impact load F input from a side of the vehicle is efficiently transmitted from the second attachment member 50 to the battery cross members 7 via the fixing points between the second attachment member 50 and the battery pack 3. Accordingly, the impact load F can be supported by the battery cross members 7, and deformation of the battery pack 3 can be suppressed. In addition, since the second attachment member 50 is fixed to below the battery pack 3, when the impact load F is input from a side of the vehicle, a direction of a load that acts on the fixing points of the battery pack 3 is an upward direction with respect to the vehicle. Accordingly, a load can be efficiently transmitted to the battery cross members 7 which is present above the fixing points.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body lower structure comprising:
    a battery pack provided below a floor panel;
    a pair of left and right side sills provided on a vehicle body side portion; and
    a battery side frame that extends between the side sills and the battery pack in a forward/rearward direction and that is configured to support the battery pack,
    wherein the battery side frame has:
    a first attachment member fixed to the side sills; and
    a second attachment member that is coupled to the battery pack and that constitutes a closed cross section between the first attachment member and the battery pack,
    the second attachment member includes an inner sidewall disposed inside in a vehicle width direction, an outer wall disposed outside in the vehicle width direction and a lower wall disposed below of the inner sidewall and the outer wall,
    the closed cross section is constituted by at least the inner sidewall, the outer wall and the lower wall of the second attachment member,
    the lower wall of the second attachment member includes an inclined section that inclines in between the inner sidewall and the outer wall, and
    the first attachment member has an outer fixing point fixed to the side sills and an inner fixing point fixed to the lower wall that constitutes the closed cross section of the second attachment member.

2. The vehicle body lower structure according to claim 1, wherein the second attachment member has an extended installation section extending from the lower wall that constitutes the closed cross section toward the battery pack, and the extended installation section is fixed to the battery pack.

3. The vehicle body lower structure according to claim 2, wherein the second attachment member forms the closed cross section using an outer plate disposed outside in the vehicle width direction and includes the outer wall; and an inner plate disposed inside in the vehicle width direction and includes the inner sidewall, the outer plate and the inner plate have the extended installation sections, respectively, and the extended installation sections of the outer plate and the inner plate overlap each other and are fixed to the battery pack.

4. The vehicle body lower structure according to claim 1, wherein a battery cross member extending inside the battery pack in the vehicle width direction is provided, and the second attachment member is fixed to the battery pack at below the battery cross member.

5. The vehicle body lower structure according to claim 1, wherein a lower surface section of the first attachment member has an inclined section inclined downward as it goes inward in the vehicle width direction.

* * * * *